United States Patent
Ma et al.

(10) Patent No.: US 11,021,183 B2
(45) Date of Patent: Jun. 1, 2021

(54) STROLLER

(71) Applicant: Goodbaby Child Products Co., Ltd., Jiangsu (CN)

(72) Inventors: Fusheng Ma, Jiangsu (CN); Weijun Yan, Jiangsu (CN); Heng Qi, Jiangsu (CN)

(73) Assignee: Goodbaby Child Products Co., Ltd., Jiangsu (CN)

( * ) Notice: Subject to any disclaimer, the term of this patent is extended or adjusted under 35 U.S.C. 154(b) by 0 days.

(21) Appl. No.: 16/618,780

(22) PCT Filed: Nov. 30, 2017

(86) PCT No.: PCT/CN2017/113850
§ 371 (c)(1),
(2) Date: Dec. 2, 2019

(87) PCT Pub. No.: WO2018/218905
PCT Pub. Date: Dec. 6, 2018

(65) Prior Publication Data
US 2020/0139999 A1    May 7, 2020

(30) Foreign Application Priority Data
Jun. 1, 2017 (CN) .......................... 201710402809.0

(51) Int. Cl.
*B62B 7/08* (2006.01)

(52) U.S. Cl.
CPC .............. *B62B 7/086* (2013.01); *B62B 7/083* (2013.01); *B62B 2205/02* (2013.01); *B62B 2205/06* (2013.01)

(58) Field of Classification Search
CPC ..... B62B 7/086; B62B 7/083; B62B 2205/02; B62B 2205/06
(Continued)

(56) References Cited

U.S. PATENT DOCUMENTS 6,830,254 B2 * 12/2004 Lan .................... B62B 7/083
                                                    280/47.4
8,066,300 B2 * 11/2011 Ohnishi ................ B62B 7/08
                                                    280/647
(Continued)

FOREIGN PATENT DOCUMENTS

| CN | 106515831 | 3/2017 |
| CN | 106697031 | 5/2017 |
| CN | 107264600 | 10/2017 |

OTHER PUBLICATIONS

International Search Report and Written Opinion issued in PCT Application No. PCT/CN2017/113850, dated Mar. 7, 2018, in 8 pages.

*Primary Examiner* — John D Walters
(74) *Attorney, Agent, or Firm* — Knobbe, Martens, Olson & Bear, LLP

(57) ABSTRACT

A stroller, comprises two side supports (100) respectively disposed on the left and right sides, and the side support (100) on each side comprises a front support (1), a rear support (2), a push rod (3), an upper support rod (4), an upper connecting rod (5), a rear connecting rod (6), a lower connecting rod (7), and a sliding member (8) disposed on the rear support (2) and capable of sliding up and down along the length extension direction of the rear support (2), wherein the rear connecting rod (6) is pivotally connected to the upper support rod (4), one end portion of the rear connecting rod (6) is pivotally connected with the sliding member (8), the other end portion of the rear connecting rod (6) is pivotally connected with a lower portion of the upper connecting rod (5), an upper portion of the upper connecting rod (5) is pivotally connected to the push rod (3), one end portion of the lower connecting rod (7) is pivotally connected to the front support (1), and the other end portion of the lower connecting rod (7) is pivotally connected with the
(Continued)

sliding member (8). When a stroller frame is folded, the sliding member (8) slides downwardly along the rear support (2), and the upper support rod (4) rotates backward and folds up on a rear side of the rear support (2). The stroller frame can be unfolded or folded by pressing or pulling the push rod (3) with one single hand, and the folded frame is flat and neat, and has a volume small enough for transportation and carrying.

19 Claims, 12 Drawing Sheets

(58) Field of Classification Search
USPC .......................................................... 280/647
See application file for complete search history.

(56) References Cited

U.S. PATENT DOCUMENTS

| | | | |
|---|---|---|---|
| 8,186,706 B2* | 5/2012 | Dotsey | B62B 7/10 |
| | | | 280/647 |
| 8,991,853 B2* | 3/2015 | Li | B62B 3/022 |
| | | | 280/650 |
| 9,090,277 B1 | 7/2015 | Chen | |
| 9,096,250 B2* | 8/2015 | Cheng | B62B 7/068 |
| 9,421,991 B2* | 8/2016 | Driessen | B62B 7/08 |
| 9,517,788 B2* | 12/2016 | He | B62B 7/08 |
| 10,053,130 B1* | 8/2018 | McNamara | B62B 7/10 |

\* cited by examiner ed to the front support, and the other end portion of the lower connecting rod is pivotally connected with the sliding member, and when the stroller frame is folded, the sliding member slides downwardly along the rear support, and the upper support rod is rotated backward and folds up on a rear side of the rear support.

STROLLER

CROSS-REFERENCE TO RELATED APPLICATIONS

This application is the U.S. National Phase under 35. U.S.C. § 371 of International Application PCT/CN2017/113850, filed Nov. 30, 2017, which claims priority to Chinese Patent Application No. 201710402809.0, filed Jun. 1, 2017. The disclosures of the above-described applications are hereby incorporated by reference in their entirety.

FIELD OF INVENTION

The present disclosure relates to a stroller.

BACKGROUND OF THE INVENTION

In the prior art, there is a great variety of strollers, rod pieces thereof are different from one another, and accordingly, the folding principles and folded structures of respective strollers are different. At present, the existing strollers in the market, mostly have the disadvantages of a large amount of rod pieces and a large size of the folded structure, high production cost, and inconvenience for daily storage and carrying. Although a part of those strollers can achieve a small folded dimension, the folding operation are relatively cumbersome, and it usually needs a plurality of steps to achieve the folding operation.

SUMMARY OF THE INVENTION

The present disclosure is aimed at providing a stroller that has a simple structure, is easy to get folded and operate, and has a small flat volume after folding.

To achieve the above mentioned purpose, a technical solution employed by the present disclosure is: A stroller, comprises a stroller frame with an unfolded state and a folded state, a front wheel assembly disposed at front of a bottom of the stroller frame, a rear wheel assembly disposed at rear of a bottom of the stroller frame, and a lock mechanism for locking the stroller frame in the unfolded state, the stroller frame comprises two side supports respectively disposed on left and right sides, and a transverse brace assembly connected between the side supports on two sides, and the side support on each side comprises a front support, a rear support, a push rod and an upper support rod each extending along an up-down direction, two components of an upper portion of the front support, an upper portion of the rear support and a lower portion of the upper support are pivotally connected and the rest one is pivotally connected to one of the two components, or the three components are pivotally connected around a same center line of rotation, and an upper portion of the upper support rod is pivotally connected with a lower portion of the push rod;

the side support on each side further comprises an upper connecting rod, a rear connecting rod, a lower connecting rod, and a sliding member disposed on the rear support capable of sliding up and down along a length extension direction of the rear support, wherein, the rear connecting rod is pivotally connected to the upper support rod, one end portion of the rear connecting rod is pivotally connected with the sliding member, the other end portion of the rear connecting rod is pivotally connected with a lower portion of the upper connecting rod, an upper portion of the upper connecting rod is pivotally connected to the push rod, one end portion of the lower connecting rod is pivotally connected to the front support, and the other end portion of the lower connecting rod is pivotally connected with the sliding member, and when the stroller frame is folded, the sliding member slides downwardly along the rear support, and the upper support rod is rotated backward and folds up on a rear side of the rear support.

Preferably, the push rod, the upper support rod, the upper connecting rod and the rear connecting rod form a four-bar linkage, the rear connecting rod, the upper support rod, the rear support and the sliding member form a first crank slider mechanism, the front support, the rear support, the lower connecting rod and the sliding member form a second crank slider mechanism, and when the push rod is rotated with respect to the upper support rod, it drives the four-bar linkage, the first crank slider mechanism and the second crank slider mechanism to move to achieve unfolding or folding of the stroller frame.

Preferably, the upper portion of the front support is pivotally connected with the upper portion of the rear support via a first shaft, the lower portion of the upper support rod is pivotally connected with the upper portion of the rear support via a second shaft, and an axis of the first shaft and an axis of the second shaft are parallel with each other or extend collinearly; the upper portion of the upper support rod is pivotally connected with the lower portion of the push rod via a third shaft, the rear connecting rod is pivotally connected to the upper support rod via a fourth shaft, and a position at which the fourth shaft is on the upper support rod is located between the second shaft and the third shaft; a front portion of the lower connecting rod is connected to the front support via a fifth shaft, and a position at which the fifth shaft is on the front support is located below the first shaft.

Further, the upper portion of the upper connecting rod is pivotally connected to the push rod via a sixth shaft, and a position at which the sixth shaft is on the push rod is located above the third shaft; the lower portion of the upper connecting rod is pivotally connected with an upper portion of the rear connecting rod via a seventh shaft, a lower portion of the rear connecting rod is pivotally connected to the sliding member via a eighth shaft, and positions at which the seventh shaft and the eighth shaft are on the rear connecting rod are respectively disposed at an upper and lower sides of the fourth shaft; a rear portion of the lower connecting rod is pivotally connected to the sliding member via a ninth shaft, and an axis of the eighth shaft and an axis of the ninth shaft are parallel with each other or extend collinearly.

Preferably, the sliding member is a sliding rod sliding up and down along the length extension direction of the rear support, and the lower portion of the rear connecting rod and the rear portion of the lower connecting rod are respectively connected to a lower portion of the sliding rod.

Further, an inner side of the rear support is provided with a guiding structure for sliding guide the sliding rod, and when the stroller frame is in the unfolded state, on the side support of each side, the sliding rod protrudes upward from the rear support, and the sliding rod and the rear support extend along one length direction; when the stroller frame is in the folded state, the sliding rod folds up in the inner side of the rear support.

More further, the side support on each side further comprises a side connecting rod, an end portion of the side connecting rod is pivotally connected with an upper portion of the sliding rod, and the other end portion of the side connecting rod is connected to the upper connecting rod capable of rotating with respect to the upper connecting rod together with sliding up and down along a length extension direction of the upper connecting rod.

More further, the side connecting rod is pivotally connected with the upper end portion of the sliding rod via a tenth shaft, and the other end portion of the side connecting rod is pivotally connected with a connecting rod sliding member, the connecting rod sliding member is disposed on the upper connecting rod capable of sliding up and down, and when the stroller frame is in the unfolded state, the tenth shaft is located in front of the connecting rod sliding member.

As a specific implementation, the side connecting rod comprises a first side rod of which a rear portion is pivotally connected with the connecting rod sliding member, and a second side rod extending downward from the first side rod, a lower end portion of the second side rod is pivotally connected with the upper end portion of the sliding rod, between front portions of the first side rods on two sides are connected with a side transverse rod, and the side connecting rods on two sides and the side transverse rod form an armrest assembly.

More further, the side support on each side further comprises a seat rod assembly, the seat rod assembly comprises a front seat rod and a rear seat rod, a front portion of the front seat rod is pivotally connected via an eleventh shaft with an upper portion of the sliding rod or with a lower portion of the side connecting rod, a rear portion of the front seat rod is pivotally connected with a front portion of the rear seat rod via a twelfth shaft, and a rear portion of the rear seat rod is pivotally connected to the rear connecting rod via a thirteen shaft, wherein, axes of the eleventh shaft and the tenth shaft are parallel with each other or extend collinearly, and a position at which the thirteen shaft is on the rear connecting rod is located below a center line around which the rear connecting rod and the upper connecting rod are rotating with respect to each other.

Preferably, a lower portion of the front support on each side is provided with a set of the front wheel assembly, a lower portion of the rear support on each side is provided with a set of the rear wheel assembly, and when the front support and the rear support fold up along a front-rear direction, two sets of the front wheel assemblies fold up between two sets of the rear wheel assemblies along a left-right direction.

Preferably, the push rod comprises a lower push rod and an upper push rod slidably connected to the lower push rod capable of sliding along a length extension direction of the lower push rod, a lower portion of the lower push rod is pivotally connected with the upper portion of the upper support rod, and the upper portion of the upper connecting rod is pivotally connected to the lower push rod.

Preferably, the transverse brace assembly comprises a front transverse rod fixedly disposed between the lower portions of the front supports on the two sides, an upper transverse rod fixedly disposed between upper portions of the push rods on the two sides, and/or one or more lower transverse rods fixedly disposed between the lower connecting rods on the two sides, wherein, the front supports on the two sides and the front transverse rod form a U-shaped rod with an upward opening, and the push rods on the two sides and the upper transverse rod form a U-shaped rod with a downward opening.

Preferably, after the front support, the rear support, the upper support rod, the push rod, the upper connecting rod, the rear connecting rod and the lower connecting rod of the side support on each side fold up with respect to each other to achieve a primary folding of the stroller frame, the side supports on the two sides fold up in opposite directions with respect to the transverse brace assembly in a left-right direction to achieve a secondary folding of the stroller frame.

Further, the transverse brace assembly comprises a first transverse brace disposed between the front supports on the two sides, a second transverse brace disposed between the rear supports on the two sides, and a third transverse brace disposed between the push rods on the two sides, the first transverse brace is pivotally connected with the front supports on the two sides respectively via 1-1 shafts, the second transverse brace is pivotally connected with the rear supports on the two sides respectively via 2-1 shafts, the third transverse brace is pivotally connected with the push rods on the two sides respectively via 3-1 shafts, and when the primary folding of the stroller frame has been completed, axes of the 1-1 shaft, the 2-1 shaft and the 3-1 shaft on the same side are parallel with each other or extend collinearly.

Preferably, the transverse brace assembly is disposed between the side supports on the two sides capable of folding up in a left-right direction, and the transverse brace assembly comprises a bottom transverse brace rod assembly and/or a rear transverse brace rod assembly each capable of unfolding and folding up in the left-right direction, wherein the bottom transverse brace rod assembly is disposed between the front supports on the two sides and the lower portions of the rear connecting rods or the sliding members on the two sides, and the rear brace rod assembly is disposed between the rear supports on the two sides and the rear portions of the lower connecting rods or the sliding members on the two sides.

Further, the rear brace rod assembly is a cross-shaped brace assembly comprising two rear brace rods pivotally connected with each other at middle portions thereof, one end portion of each of the rear brace rod is rotatably connected to the upper portion of the rear support on one side and the other end portion thereof is rotatably connected to the rear portion of the lower connecting rod or to the sliding member on the other side;

the bottom transverse brace rod assembly comprises two sets of first rods and second rods respectively pivotally connected with each other end to end, middle portions of two of the first rods are pivotally connected with each other and middle portions of two of the second rods are pivotally connected with each other, the other ends of two of the first rods are respectively rotatably connected to the front support and the lower portion of the rear connecting rod of the side support on one side, and the other ends of two of the second rods are respectively rotatably connected to the lower portion of the rear connecting rod and the front support of the side support on the other side.

More further, the transverse brace assembly further comprises an upper brace rod assembly disposed between the upper portions of the push rods on the two sides, the upper brace rod assembly comprises two upper brace rods pivotally connected end to end, and the other ends of the two upper brace rods are respectively pivotally connected with the upper portions of the push rods.

Due to the use of the above technical solutions, the present disclosure has the following advantages over the prior art: The stroller of the present disclosure, employs a stroller frame structure of a novel structure and folding principle, so that the stroller frame can be unfolded and folded in one step by one hand, convenient to use. Meanwhile, the folded stroller frame is flat and neat, and has a volume small enough for transportation and carrying.

wherein: 100—side support; 30—front wheel assembly; 40—rear wheel assembly; 1—front support; 2—rear support; 3—push rod; 31—lower push rod; 32—upper push rod; 4—upper support rod; 5—upper connecting rod; 6—rear connecting rod; 7—lower connecting rod; 8—sliding member (sliding rod); 9—side connecting rod; 9a—first side rod; 9b—second side rod; 9c—side transverse rod; 10—connecting rod sliding member (sliding sleeve); 11—front seat rod; 12—rear seat rod;

201—front transverse rod; 202—lower transverse rod; 203—upper transverse rod; 204—first transverse brace; 205—second transverse brace; 206—third transverse brace; 207—rear brace rod assembly; 207a—rear brace rod; 208—bottom transverse brace rod assembly; 208a—first rod; 208b—second rod; 209—upper brace rod assembly; 209a—upper brace rod;

101—first shaft; 102—second shaft; 103—third shaft; 104—fourth shaft; 105—fifth shaft; 106—sixth shaft; 107—seventh shaft; 108—eighth shaft; 109—ninth shaft; 110—tenth shaft; 111—eleventh shaft; 112—twelfth shaft; 113—thirteen shaft; 211—1-1 shaft; 221—2-1 shaft; 231—3-1 shaft.

DETAILED DESCRIPTION OF EXEMPLARY EMBODIMENTS

In the following, the technical solution of the present disclosure is further explained in detail combining with the accompanying drawings and specific embodiments.

Embodiment 1

Referring to a stroller as shown in FIGS. 1 to 4, it comprises a stroller frame with an unfolded state and a folded state, a front wheel assembly 30 disposed at the front of a bottom of the stroller frame, a rear wheel assembly disposed at the rear of the bottom of the stroller frame, and a lock mechanism for locking the stroller frame in the unfolded state, and the stroller frame comprises two side supports 100 respectively disposed on left and right sides, and transverse brace assembly(s) connected between the side supports 100 on the two sides.

Figure 1:
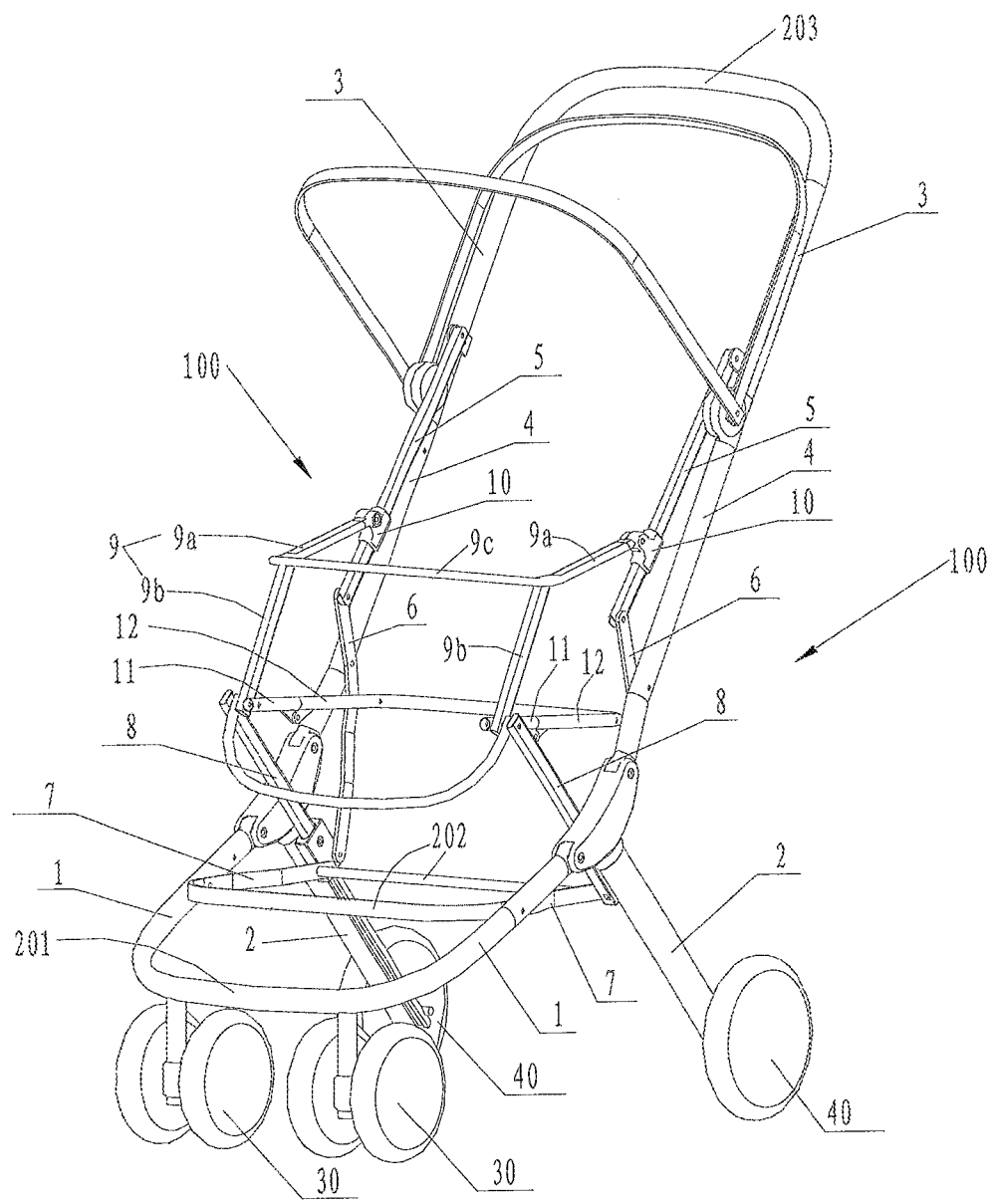
FIG. 1 is a space diagram of a stroller in an unfolded state of Embodiment 1.
Figure 2:
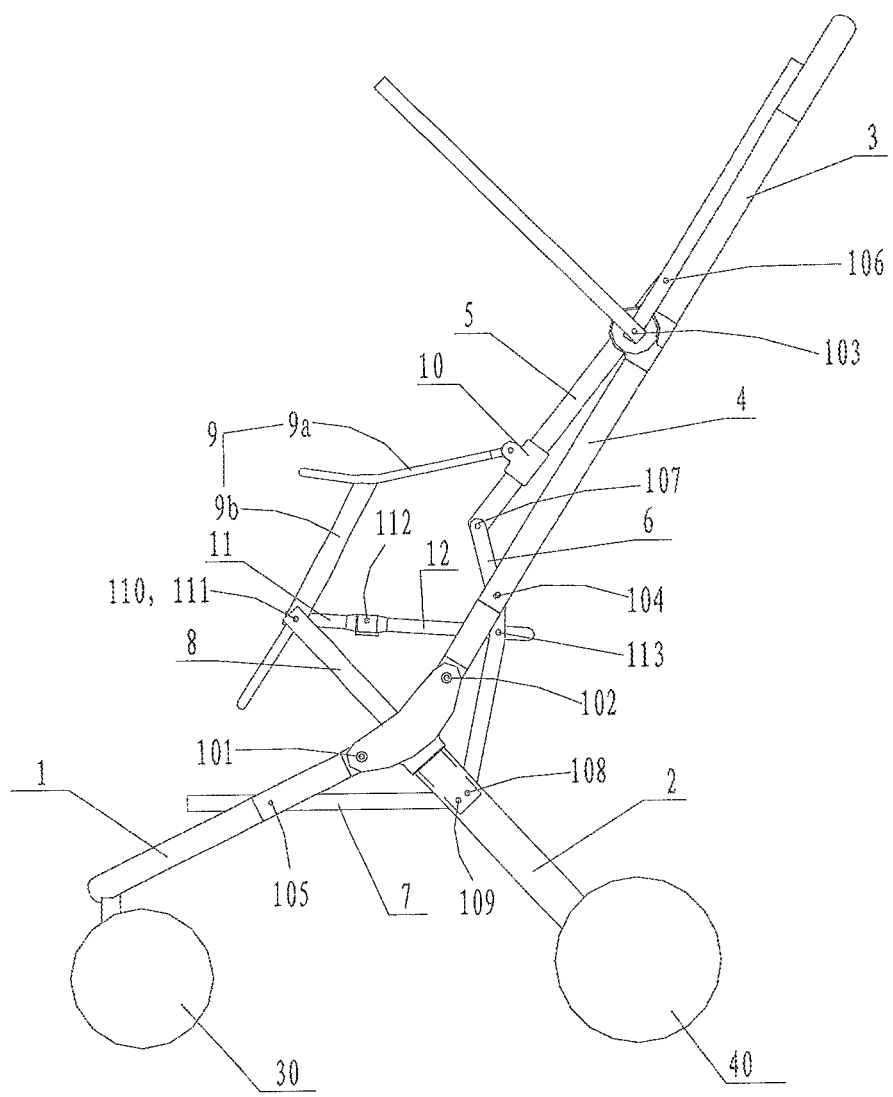
FIG. 2 is a side view of the stroller in an unfolded state of Embodiment 1.
Figure 3:
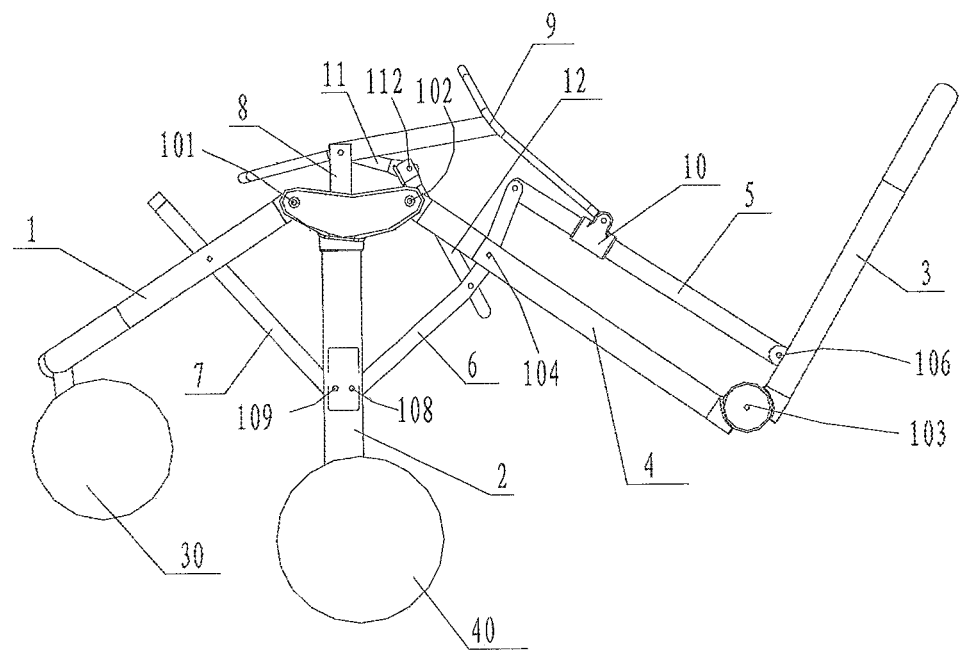
FIG. 3 is a side view of the stroller in a half-folded state of Embodiment 1.

Referring to FIGS. 1 to 3, the side support 100 on each side comprises a front support 1, a rear support 2, a push rod 3 and an upper support rod 4 each extending along an up-down direction, two components of an upper portion of the front support 1, an upper portion of the rear support 2 and a lower portion of the upper support 4 are pivotally connected and the rest one is pivotally connected to one of the two components, or the three components are pivotally connected around a same center line of rotation, as shown in FIGS. 1 and 2, in this embodiment, the upper portion of the front support 1 is pivotally connected with the upper portion of the rear support 2 via a first shaft 101, the lower portion of the upper support rod 4 is pivotally connected with the upper portion of the rear support 2 via a second shaft 102, an axis of the first shaft 101 and an axis of the second shaft 102 are parallel with each other and respectively disposed on a front and rear sides of the rear supports 2, and of course, in some embodiments, the axes of the first shaft 101 and the second shaft 102 may also be disposed to extend collinearly; an upper portion of the upper support rod 4 is pivotally connected with a lower portion of the push rod 3 via a third shaft 103.

Referring to FIGS. 1 to 3, the side support 100 on each side further comprises an upper connecting rod 5, a rear connecting rod 6, a lower connecting rod 7, and a sliding member 8 disposed on the rear support 2 capable of sliding up and down along a length extension direction of the rear support 2, wherein, the rear connecting rod 6 is pivotally connected to the upper support rod 4, one end portion of the rear connecting rod 6 is pivotally connected with the sliding member 8 and the other end portion thereof is pivotally connected with a lower portion of the upper connecting rod 5, an upper portion of the upper connecting rod 5 is pivotally connected to the push rod 3; one end portion of the lower connecting rod 7 is pivotally connected to the front support 1 and the other end portion thereof is pivotally connected with the sliding member 8, in this way, the push rod 3, the upper support rod 4, the upper connecting rod 5 and the rear connecting rod 6 form a four-bar linkage, the rear connecting rod 6, the upper support rod 4, the rear support 2 and the sliding member 8 form a first crank slider mechanism, and the front support 1, the rear support 2, the lower connecting rod 7 and the sliding member 8 form a second crank slider mechanism. When the push rod 3 is rotated with respect to the upper support rod 4, it drives the four-bar linkage, the rod pieces of the first crank slider mechanism and the second crank slider mechanism to move with respect to each other to achieve unfolding or folding of the stroller frame.

In particular, referring to FIGS. 1 to 3, in this embodiment, the sliding member 8 adopts a sliding rod, the sliding rod 8 is disposed on an inner side of the rear support 2 capable of sliding upward along the length extension direction of the rear support 2, such that the sliding rod 8 may protrude upward along the length extension direction of the rear support 2 and extends along a same length direction with the rear support 2, or the sliding rod 8 slides downward and folds up in the inner side of the rear support 2. The inner side of the rear support 2 is further provided with a guiding structure for sliding guide the sliding rod 8, and here, it adopts a guide rail structure.

The middle portion of the rear connecting rod 6 is pivotally connected to the upper support rod 4 via a fourth shaft 104, and a position at which the fourth shaft 104 is on the upper support rod 4 is located between the second shaft 102 and the third shaft 103; a front portion of the lower connecting rod 7 is connected to the front support 1 via a fifth shaft 105, and a position at which the fifth shaft 105 is on the front support 1 is located below the first shaft 101; the upper portion of the upper connecting rod 5 is pivotally connected to the push rod 3 via a sixth shaft 106, and a position at which the sixth shaft 106 is on the push rod 3 is located above the third shaft 103; the lower portion of the upper connecting rod 5 is pivotally connected with an upper portion of the rear connecting rod 6 via a seventh shaft 107, a lower portion of the rear connecting rod 6 is pivotally connected to the lower portion of the sliding rod 8 via a eighth shaft 108, and positions at which the seventh shaft 107 and the eighth shaft 108 are on the rear connecting rod 6 are respectively disposed at an upper and lower sides of the fourth shaft 104; a rear portion of the lower connecting rod 7 is pivotally connected to the lower portion of the sliding rod 8 via a ninth shaft 109, and the eighth shaft 108 and an axis of the ninth shaft 109 may be two shafts of which axes are parallel with each other, or may be one or two shafts of which axes extend collinearly.

Referring to FIGS. 1 to 3, the side support 100 on each side further comprises a side connecting rod 9, an end portion of the side connecting rod 9 is pivotally connected with the upper portion of the sliding rod 8, and the other end portion of the side connecting rod 9 is connected to the upper connecting rod 5 capable of rotating with respect to the upper connecting rod 5 and sliding up and down along a length extension direction of the upper connecting rod 5. In this embodiment, the side connecting rod 9 is pivotally connected with the upper end portion of the sliding rod 8 via a tenth shaft 110, and the other end portion of the side connecting rod 9 is pivotally connected with a connecting rod sliding member 10, the connecting rod sliding member 10 is disposed on the upper connecting rod 5 capable of sliding up and down, and when the stroller frame is in the unfolded state, the tenth shaft 110 is located in front of the connecting rod sliding member 10. Here, the connecting rod sliding member 10 adopts a sliding sleeve slidably sleeved over the upper connecting rod 5.

Here, the side connecting rod 9 comprises a first side rod 9a extending approximately along a front-rear direction, and a second side rod 9b extending downward from the front portion of the first side rod 9a, a rear portion of the first side rod 9a is pivotally connected with the connecting rod sliding member 10, a lower portion of the second side rod 9b is pivotally connected with the upper end portion of the sliding rod 8 via the above mentioned tenth shaft 110. Between front portions of the first side rods 9a on two sides is connected a side transverse rod 9c, so that when the stroller frame is unfolded, the side connecting rod 9 on both sides and the side transverse rod 9c form an armrest assembly.

The side support 100 on each side further comprises a seat rod assembly, the seat rod assembly comprises a front seat rod 11 and a rear seat rod 12, a front portion of the front seat rod 11 is pivotally connected with an upper portion of the sliding rod 8 or with a lower portion of the side connecting rod 9 via an eleventh shaft 111, and the axes of the eleventh shaft 111 and the tenth shaft 110 are disposed parallel with each other or are collinearly disposed according to this embodiment; a rear portion of the front seat rod 11 is pivotally connected with a front portion of the rear seat rod 12 via a twelfth shaft 112, and a rear portion of the rear seat rod 12 is pivotally connected to the rear connecting rod 6 via a thirteen shaft 113, and a position at which the thirteen shaft 113 is on the rear connecting rod 6 is located below the fourth shaft 104.

Referring to FIGS. 1 to 4, in this embodiment, the transverse brace assembly are a plurality of transverse rods fixedly disposed between the side supports 100 on the two sides, specifically, the transverse brace assembly comprises a front transverse rod 201 fixedly disposed between the lower portions of the front supports 1 on the two sides, one or more lower transverse rods 202 fixedly disposed between the lower connecting rods 7 on the two sides, and an upper transverse rod 203 fixedly disposed between upper portions of the push rods 3 on the two sides, wherein, the front supports 1 on the two sides and the front transverse rod 201 are formed integrally to form a U-shaped rod with an upward opening, and the push rods 3 on the two sides and the upper transverse rod 203 form a U-shaped rod with a downward opening, and the two lower transverse rods 202 disposed between the lower connecting rods 7 on the two sides and the two lower connecting rods 7 form a frame structure. The above mentioned transverse brace assembly provides a stable transverse support between the two side supports 100 on the two sides when the stroller frame is unfolded. Two of the front wheel assemblies 30 are disposed at the lower portion of the front transverse rod 201, and two of the rear wheel assemblies 40 are disposed at the lower portion of the rear support 2.

Referring to FIGS. 1 and 2, when unfolding the stroller frame of the stroller, the front supports 1 and the rear supports 2 get unfolded one after the other and stand on the ground through the front wheel assemblies 30 and the rear assemblies 40, and in the side support 100 on each side, the sliding rod 8 protrudes upward from the rear support 2, and the upper support rod 4 extends rearward and tilts upward and is approximately in the same length extension direction with the push rod 3; the rear connecting rod 6 supports and stands between the upper connecting rod 5 and the sliding rod 8, the lower connecting rod 7 supports between the front support 1 and the rear support 2, the side connecting rod 9 gets unfolded in the front of the stroller frame, and the front seat rod 11 and the rear seat rod 12 of the seat assembly get unfolded with respect to each other and support between the side connecting rod 9 and the rear connecting rod 6.

When folding the stroller frame, as shown in FIG. 3, after unlocking the lock mechanism, pushing downward the push rod 3 will turn over the push rod around the third shaft 103 with respect to the upper support rod 4, so that the upper connecting rod 5 rotates with respect to the rear connecting rod 6 and drives the sliding rod 8 to slide downward along the rear support 2, so that the rear connecting rod 6 brings the upper support rod 4 to turn over rearward and downward around the second shaft 102 with respect to the rear support 2 to gradually fold up with the rear support 2; meanwhile, the lower connecting rod 7 drives the front support 1 and the rear support 2 to gradually fold up along the front-rear direction. In the relative movement of the above mentioned rod pieces, the side connecting rod 9 is driven to gradually fold up with other rod pieces under the action of the connecting rod sliding member 10, the sliding rod 8 brings the front seat rod 11 and the rear seat rod 12 to turn over with respect to each other and to gradually fold up along with other rod pieces of the stroller frame.

Figure 4:
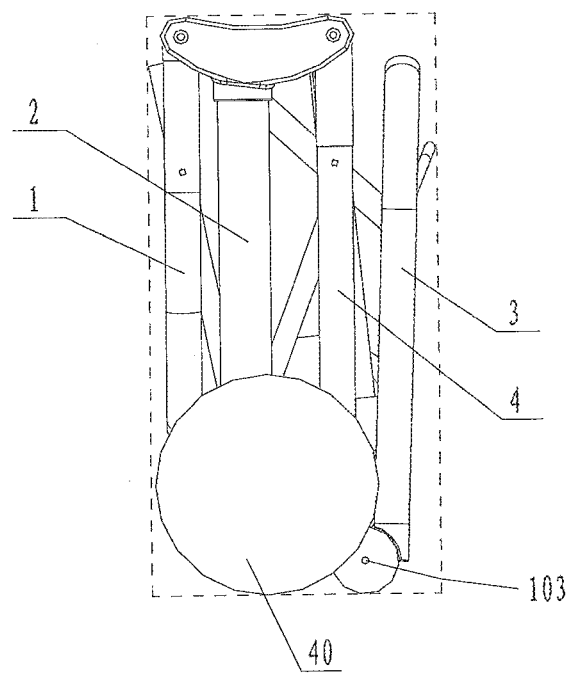
FIG. 4 is a side view of the stroller in a folded state of Embodiment 1.

After the stroller frame is completely folded, as shown in FIG. 4, the two sets of front wheel assemblies 30 fold up between the two rear wheel assemblies 40 along the left-right direction, the front support 1, the rear support 2, the upper support rod 4 and the push rod 3 are approximately parallel to each other and have an approximately same rod length, and when seen from the side, the folded stroller frame approximately presents a cuboid-shaped folding structure, and the folded frame is flat and neat, and has a volume small enough for transportation and carrying. In this state, the stroller frame may rely on a pivotal connecting position between the upper support rod 4 and the push rod 3 and on the front wheel assemblies 30 and the rear wheel assemblies 40 to stand on the ground, to achieve standing by itself after being folded.

Embodiment 2

Referring to a stroller as shown in FIGS. 5 to 10, when comparing to the stroller of Embodiment 1, the following structures are mainly adjusted:

(1) The push rods are provided to be a telescopic structure capable of adjusting the length, in particular, the push rod 3 on each side comprises a lower push rod 31 and an upper push rod 32 telescopically connected to the lower push rod 31 capable of sliding along the length extension direction of the lower push rod 31, a lower portion of the lower push rod 31 is pivotally connected with the upper portion of the upper support rod 4 via the third shaft 103, and the upper portion of the upper connecting rod 5 is pivotally connected to the lower push rod 31 via the sixth shaft 106.

(2) On the side support 100 on each side, the side connecting rod 9 is an integral rod in an arc shape extending in a rear-up direction, which can be used as an armrest rod, and which has an attractive appearance; the eighth shaft 108 via which the lower portion of the rear connecting rod 6 is pivotally connected with the sliding rod 8 and the ninth shaft 9 via which the rear portion of the lower connecting rod 7 is pivotally connected with the sliding rod 8 are coaxially provided; the inner side portion of the rear support 2 is provided with, in addition to the guide rail structure for guiding the sliding rod 8, a guide sleeve structure on the rear support 2 near the upper portion thereof, to further provide the guide of the sliding rod 8, improve the stability during sliding.

Figure 5:
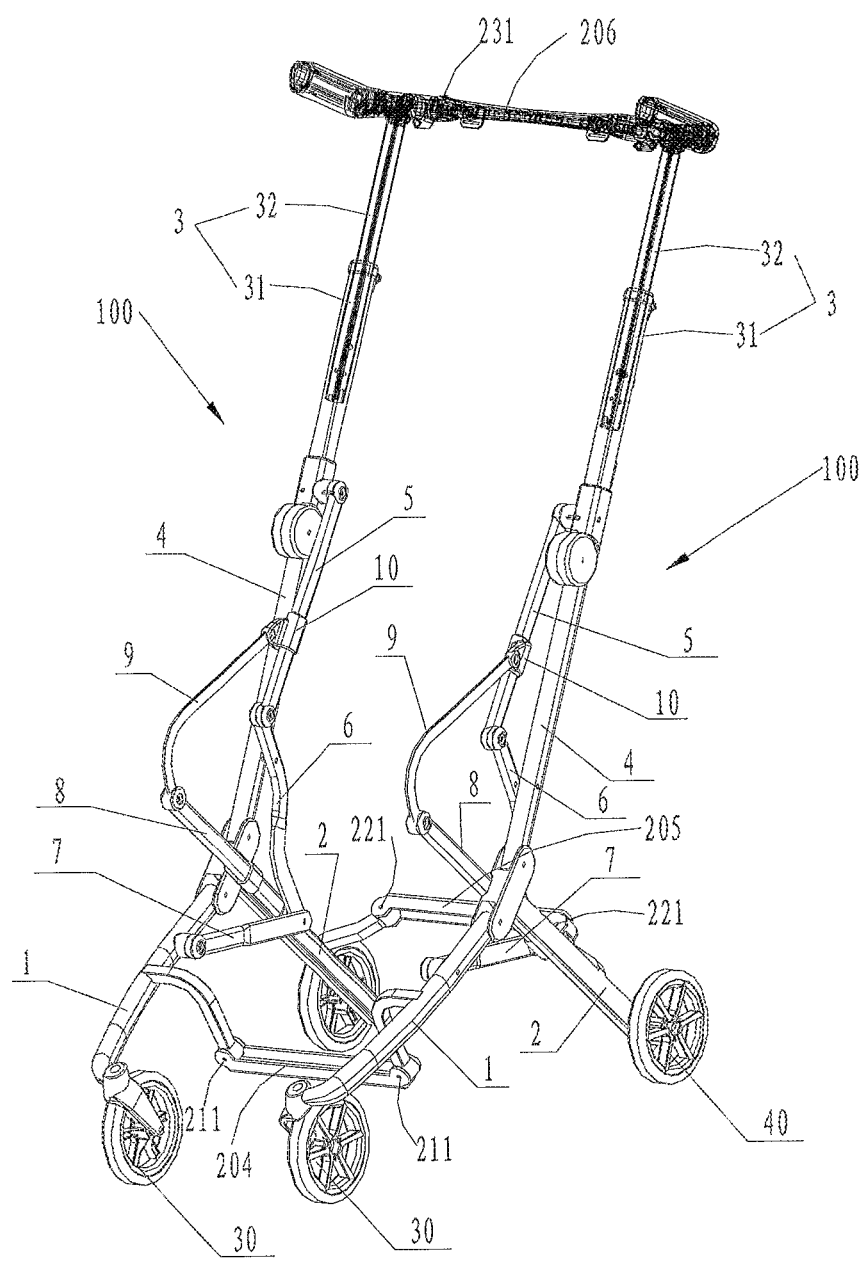
FIG. 5 is a space diagram of a stroller in an unfolded state of Embodiment 2.
Figure 6:
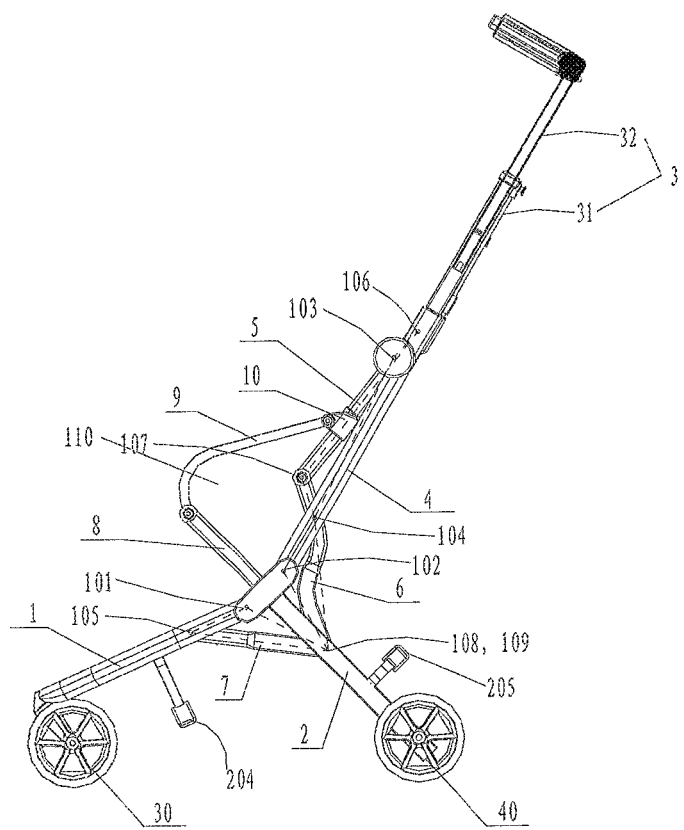
FIG. 6 is a side view of the stroller in an unfolded state of Embodiment 2.
Figure 7:
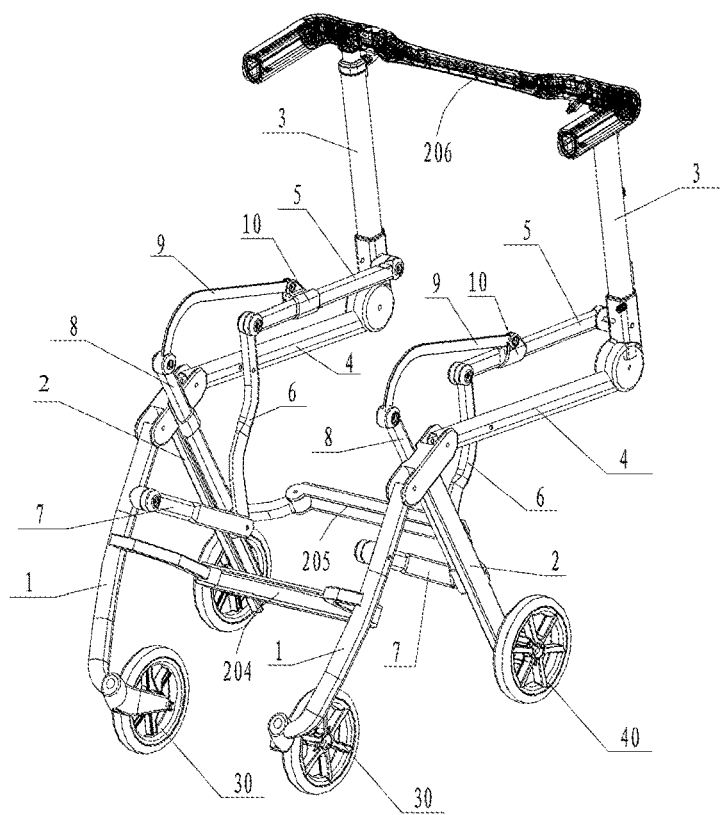
FIG. 7 is a space diagram of the stroller in a half-folded state of Embodiment 2.
Figure 8:
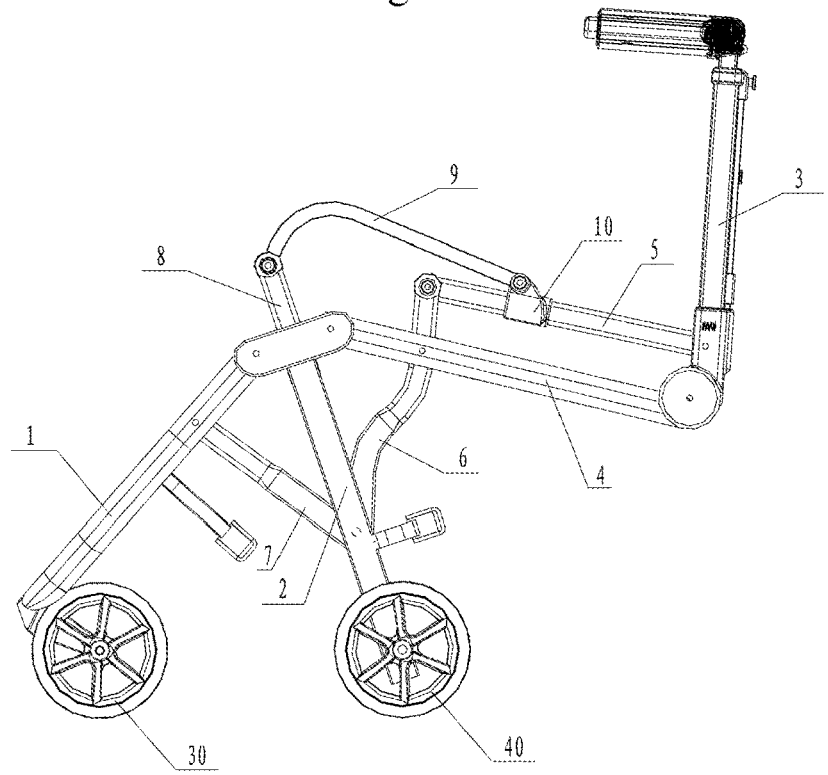
FIG. 8 is a side view of the stroller in a half-folded state of Embodiment 2.
Figure 9:
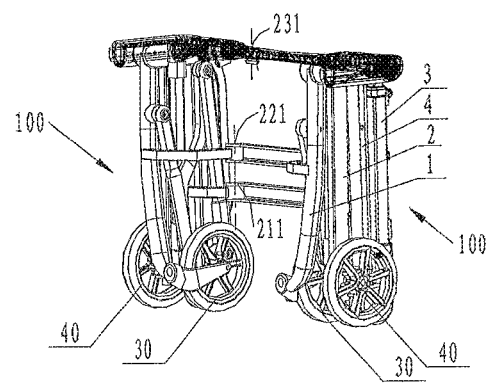
FIG. 9 is a space diagram of the stroller in a primary folded state of Embodiment 2.
Figure 10:
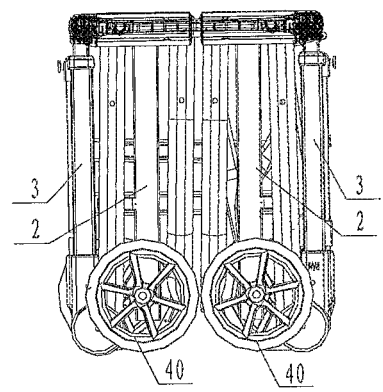
FIG. 10 is a side view of the stroller in a secondary folded state of Embodiment 2.

(3) The transverse brace assembly is disposed capable of turning over and folding up along the transverse direction. In particular, as shown in FIG. 5, the transverse brace assembly comprises a first transverse brace 204 disposed between the front supports 1 on the two sides, a second transverse brace 205 disposed between the rear supports 2 on the two sides, and a third transverse brace 206 disposed between the push rods 3 on the two sides, wherein, the first transverse brace 204 is pivotally connected with the front supports 1 on the two sides respectively via 1-1 shafts 211, the second transverse brace 205 is pivotally connected with the rear supports 2 on the two sides respectively via 2-1 shafts 221, and the third transverse brace 206 is pivotally connected with the push rods 3 on the two sides respectively via 3-1 shafts 231. The bottom of the front support 1 on each side is provided with a set of front wheel assembly 30, and the bottom of the rear support 2 on each side is provided with a set of rear wheel assembly 40. When the stroller frame is in the unfolded state, the side supports 100 on the two sides are respectively unfolded, and the first transverse brace 204, the second transverse brace 205 and the third transverse brace 206 support between the side supports 100 on the two sides along the transverse direction to provide support in the left-right direction. When the front supports 1, the rear supports 2, the push rods 3, the upper support rods 4, the upper connecting rods 5, the rear connecting rods 6 and the lower connecting rods 7 of the side supports 100 on the two sides fold up together so as to fold the side supports 100, as shown in FIG. 9, the primary folding of the stroller frame has been completed. In this state, axes of the 1-1 shaft 211, the 2-1 shaft 221 and the 3-1 shaft 231 on the same side are parallel with each other or extend collinearly, and at this moment, the side supports 100 on the two sides can be turned over with respect to the transverse brace assembly along the left-right direction, so that the secondary folding of the stroller frame is achieved, obtaining a structure as shown in FIG. 10. This can further fold the stroller frame transversely, reducing the occupied space and facilitating transportation and carrying.

Embodiment 3

Referring to a stroller shown in FIGS. 11 to 17, when comparing with the stroller of Embodiment 2, it mainly modifies the arrangement of the transverse brace assembly, and this transverse brace assembly is disposed between the side supports 100 on the two sides capable of folding up along the left-right direction, and folds up along the left-right direction when the respective rod pieces of the side supports 100 fold up by rotating with respect to each other so that the side supports 100 on the two sides fold up along the left-right direction, reducing the folded volume of the stroller frame.

Figure 11:
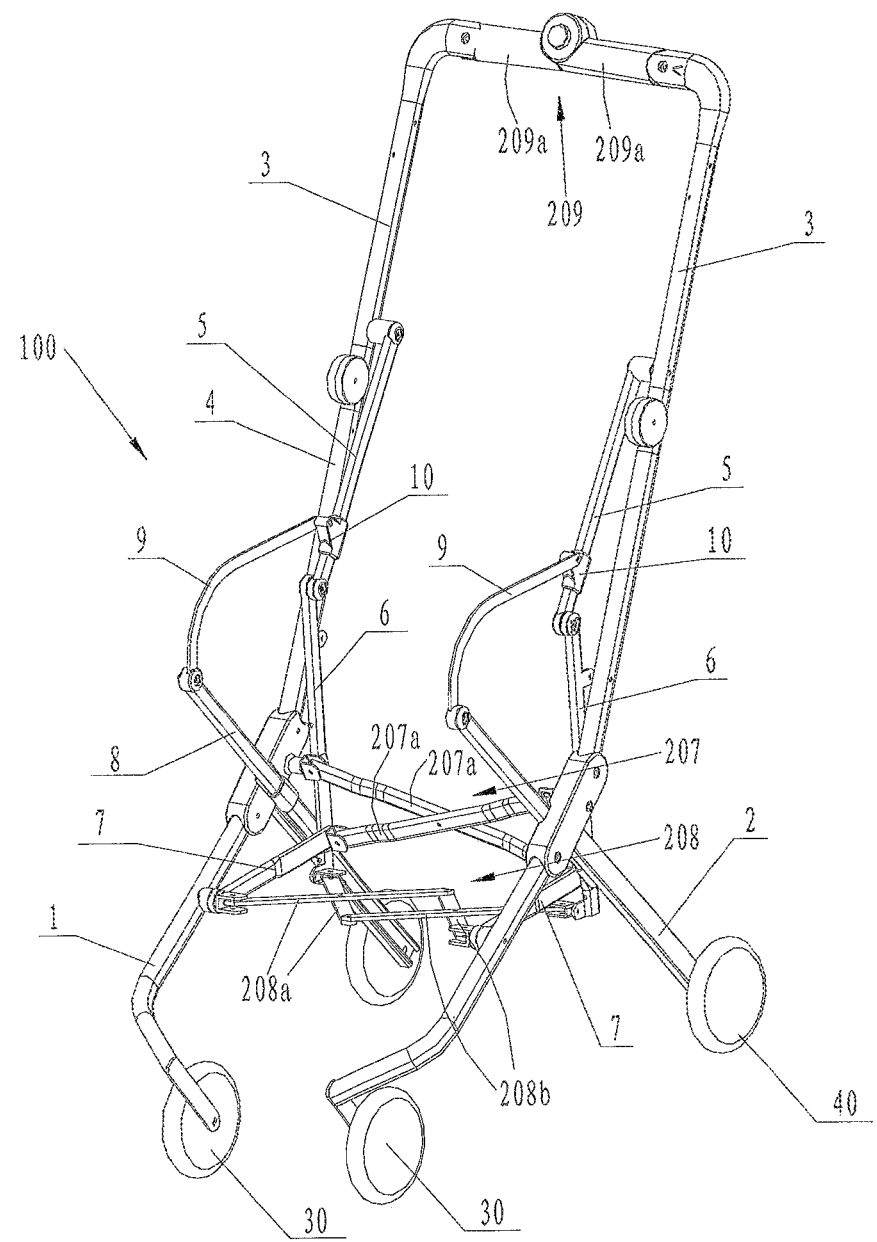
FIG. 11 is a space diagram of a stroller in an unfolded state of Embodiment 3.
Figure 14:
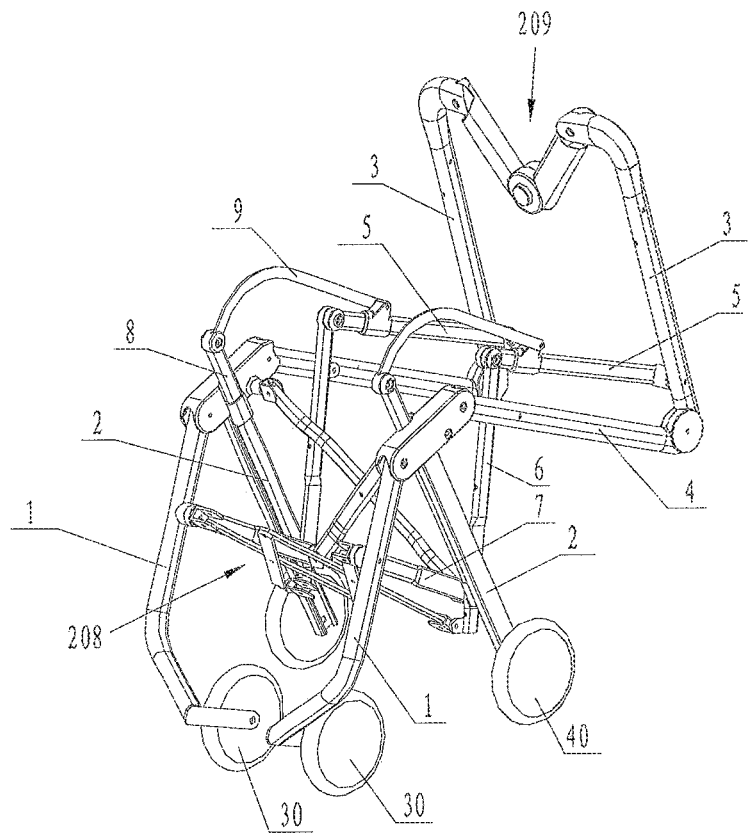
FIG. 14 is a space diagram of the stroller in a half-folded state of Embodiment 3.

In this embodiment, referring to FIGS. 11 and 14, the transverse brace assembly comprises a bottom transverse brace rod assembly 208, a rear transverse brace rod assembly 207 and an upper brace rod assembly 209 each capable of unfolding and folding up along the left-right direction, wherein, the bottom transverse brace rod assembly 208 is disposed between the front supports 1 on the two sides and the lower portions of the rear connecting rods 6 or between the front supports 1 on the two sides and the lower portions of the sliding rods 8 on the two sides; the rear brace rod assembly 207 is disposed between the rear supports 2 on the two sides and the rear portions of the lower connecting rods 7 or between the rear supports 2 on the two sides and the lower portions of the sliding rods 8 on the two sides; the upper brace rod assembly 209 is disposed between the upper portions of the push rods 3 on the two sides. The specific configuration is as follows:

Referring to FIGS. 11 to 17, the rear brace rod assembly 207 is a cross-shaped brace assembly comprising two rear brace rods 207a pivotally connected with each other at middle portions thereof, one end portion of each of the rear brace rod 207a is rotatably connected to the upper portion of the rear support 2 on one side and the other end portion thereof is rotatably connected to the rear portion of the lower connecting rod 7 on the other side, and the position where the rear portion of the lower connecting rod 7 and the rear brace rod 207a are connected is also connected to the lower portion of the sliding rod 8, in this way, it is convenient for mounting rotation connecting sheet(s) of the two end portions of rear brace rod 207a.

The bottom transverse brace rod assembly 208 comprises two sets of first rods 208a and second rods 208b respectively pivotally connected with each other end to end, middle portions of two of the first rods 208a are pivotally connected with each other and middle portions of two of the second rods 208b are pivotally connected with each other, the other ends of two of the first rods 208a are respectively rotatably connected to the front support 1 and the lower portion of the rear connecting rod 6 of the side support 100 on right side, and the other ends of two of the second rods 208b are respectively rotatably connected to the lower portion of the rear connecting rod 6 and the front support 1 of the side support 100 on the left side, wherein, the first rods 208a or the second rods 208b are rotatably connected to the positions where the front portions of the lower connecting rods 7 are connected to the front supports 1 to achieve the connection with the front support 1, and the positions where the first rods 208a or the second rods 208b are rotatably connected to the lower portions of the rear connecting rods 6 are below the ninth shaft 109.

The upper brace rod assembly 209 comprises two upper brace rods 209a pivotally connected end to end, and the other ends of the two upper brace rods 209a are respectively pivotally connected with the upper portions of the push rods 3.

Figure 12:
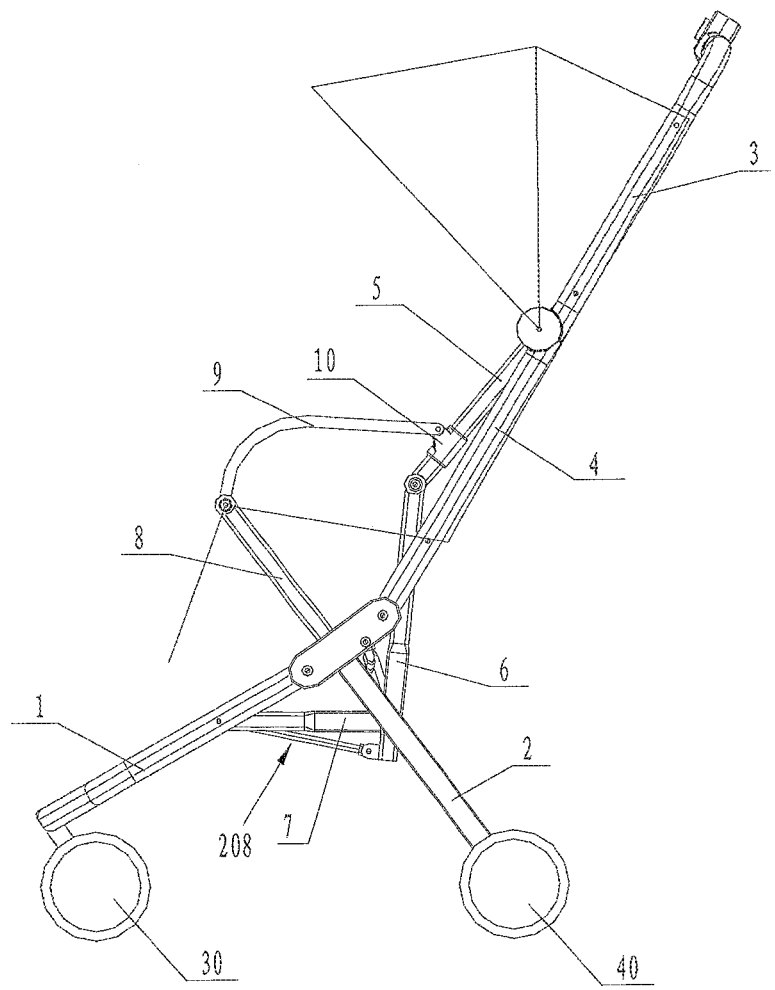
FIGS. 12 and 13 are side views of the stroller in an unfolded state of Embodiment 3.
Figure 13:
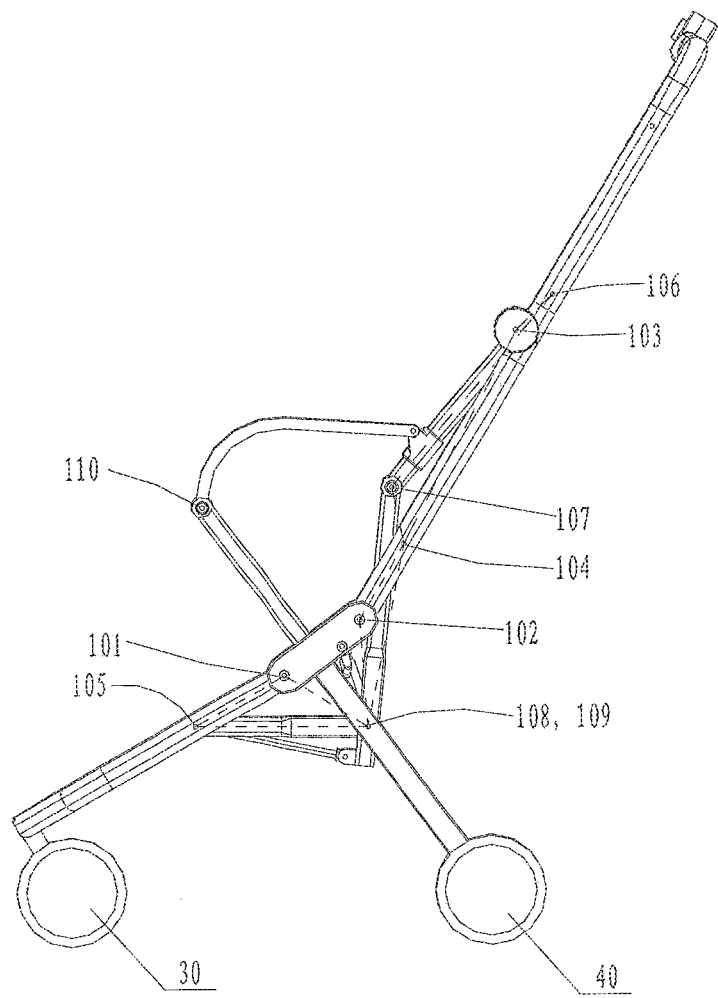

When unfolding the stroller frame, as shown in FIGS. 11 to 13, the side supports 100 on the two sides are respectively unfolded, the bottom transverse brace rod assembly 208, the rear brace rod assembly and the upper brace rod assembly 209 are unfolded along the left-right direction to support transversely between the side supports 100 on the two sides, to provide support in the left-right direction for the stroller frame.

Figure 15:
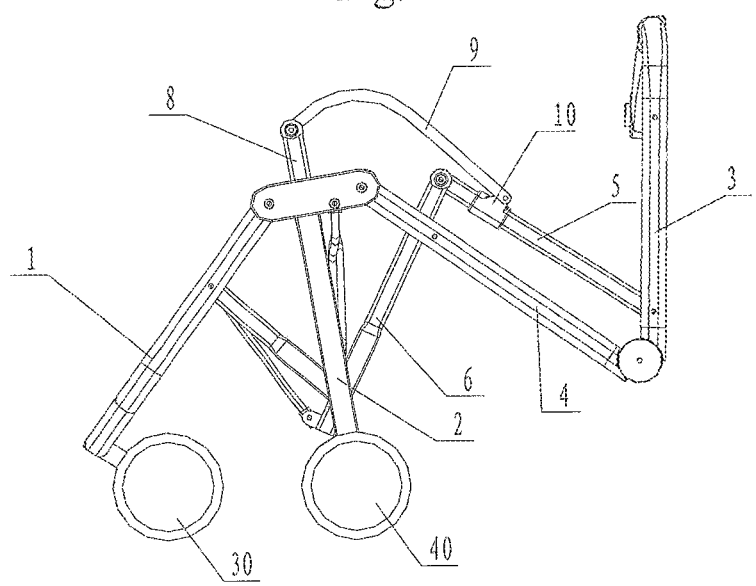
FIG. 15 is a side view of the stroller in a half-folded state of Embodiment 3.

When it requires to fold the stroller frame, as shown in FIGS. 14 and 15, during the process of pressing downward the push rods 3 to rotate with respect to the upper support rods 4, cause the sliding rods 8 to slide along the rear supports 2 and then cause the rod pieces of the side supports 100 on the two sides to turn over and fold up with respect to each other, the two upper brace rods 209a of the upper brace rod assembly 209 are rotated and folded with respect to each other, and the two rear brace rods 207a are rotated with respect to each other, so that the rear brace rod assembly 207 folds up gradually in the left-right direction, and the two first rods 208a and the two second rods 208b are rotated with respect to each other so that the bottom transverse brace rod assembly 208 also folds up gradually in the left-right direction.

Figure 16:
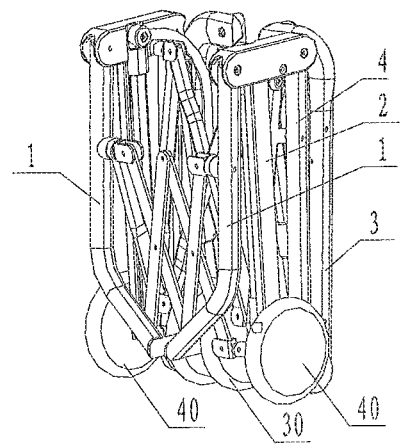
FIG. 16 is a space diagram of the stroller in a folded state of Embodiment 3.
Figure 17:
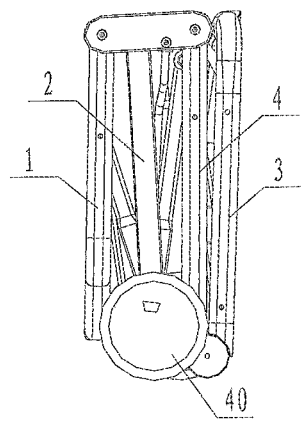
FIG. 17 is a side view of the stroller in a folded state of Embodiment 3.

Finally, the respective rod pieces of the side support 100 on either side are respectively rotated to folded, and the side supports 100 on the two sides are folded in the left-right direction, forming the structure as shown in FIGS. 16 and 17, which is also neat and compact, and the stroller may be folded by one hand, and also can stand on the ground by itself, reducing the occupied space and facilitating transportation and carrying.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A stroller, comprising a stroller frame with an unfolded state and a folded state, a front wheel assembly disposed at front of a bottom of the stroller frame, a rear wheel assembly disposed at rear of a bottom of the stroller frame, and a lock mechanism for locking the stroller frame in the unfolded state, the stroller frame comprising two side supports respectively disposed on left and right sides, and a transverse brace assembly connected between the side supports on two sides, wherein the side support on each side comprises a front support, a rear support, a push rod and an upper support rod each extending along an up-down direction, two components of an upper portion of the front support, an upper portion of the rear support and a lower portion of the upper support are pivotally connected and the rest one is pivotally connected to one of the two components, or the three components are pivotally connected around a same center line of rotation, and an upper portion of the upper support rod is pivotally connected with a lower portion of the push rod; the side support on each side further comprises an upper connecting rod, a rear connecting rod, a lower connecting rod, and a sliding member disposed on the rear support capable of sliding up and down along a length extension direction of the rear support, wherein, the rear connecting rod is pivotally connected to the upper support rod, one end portion of the rear connecting rod is pivotally connected with the sliding member, the other end portion of the rear connecting rod is pivotally connected with a lower portion of the upper connecting rod, an upper portion of the upper connecting rod is pivotally connected to the push rod, one end portion of the lower connecting rod is pivotally connected to the front support, and the other end portion of the lower connecting rod is pivotally connected with the sliding member, and when the stroller frame is folded, the sliding member slides downwardly along the rear support, and the upper support rod is rotated backward and folds up on a rear side of the rear support.

2. The stroller according to claim 1, wherein the push rod, the upper support rod, the upper connecting rod and the rear connecting rod form a four-bar linkage, the rear connecting rod, the upper support rod, the rear support and the sliding member form a first crank slider mechanism, the front support, the rear support, the lower connecting rod and the sliding member form a second crank slider mechanism, and when the push rod is rotated with respect to the upper support rod, it drives the four-bar linkage, the first crank slider mechanism and the second crank slider mechanism to move to achieve unfolding or folding of the stroller frame.

3. The stroller according to claim 1, wherein the upper portion of the front support is pivotally connected with the upper portion of the rear support via a first shaft, the lower portion of the upper support rod is pivotally connected with the upper portion of the rear support via a second shaft, and an axis of the first shaft and an axis of the second shaft are parallel with each other or extend collinearly; the upper portion of the upper support rod is pivotally connected with the lower portion of the push rod via a third shaft, the rear connecting rod is pivotally connected to the upper support rod via a fourth shaft, and a position at which the fourth shaft is on the upper support rod is located between the second shaft and the third shaft; a front portion of the lower connecting rod is connected to the front support via a fifth shaft, and a position at which the fifth shaft is on the front support is located below the first shaft.

4. The stroller according to claim 3, wherein the upper portion of the upper connecting rod is pivotally connected to the push rod via a sixth shaft, and a position at which the sixth shaft is on the push rod is located above the third shaft; the lower portion of the upper connecting rod is pivotally connected with an upper portion of the rear connecting rod via a seventh shaft, a lower portion of the rear connecting rod is pivotally connected to the sliding member via a eighth shaft, and positions at which the seventh shaft and the eighth shaft are on the rear connecting rod are respectively disposed at an upper and lower sides of the fourth shaft; a rear portion of the lower connecting rod is pivotally connected to the sliding member via a ninth shaft, and an axis of the eighth shaft and an axis of the ninth shaft are parallel with each other or extend collinearly.

5. The stroller according to claim 1, wherein the sliding member is a sliding rod sliding up and down along the length extension direction of the rear support, and the lower portion of the rear connecting rod and the rear portion of the lower connecting rod are respectively connected to a lower portion of the sliding rod.

6. The stroller according to claim 5, wherein an inner side of the rear support is provided with a guiding structure for sliding guide the sliding rod, and when the stroller frame is in the unfolded state, on the side support of each side, the sliding rod protrudes upward from the rear support, and the sliding rod and the rear support extend along one length direction; when the stroller frame is in the folded state, the sliding rod folds up in the inner side of the rear support.

7. The stroller according to claim 5, wherein the side support on each side further comprises a side connecting rod, an end portion of the side connecting rod is pivotally connected with an upper portion of the sliding rod, and the other end portion of the side connecting rod is connected to the upper connecting rod capable of rotating with respect to the upper connecting rod together with sliding up and down along a length extension direction of the upper connecting rod.

8. The stroller according to claim 7, wherein the side connecting rod is pivotally connected with the upper end portion of the sliding rod via a tenth shaft, and the other end portion of the side connecting rod is pivotally connected with a connecting rod sliding member, the connecting rod sliding member is disposed on the upper connecting rod capable of sliding up and down, and when the stroller frame is in the unfolded state, the tenth shaft is located in front of the connecting rod sliding member.

9. The stroller according to claim 8, wherein the side connecting rod comprises a first side rod of which a rear portion is pivotally connected with the connecting rod sliding member, and a second side rod extending downward from the first side rod, a lower end portion of the second side rod is pivotally connected with the upper end portion of the sliding rod, between front portions of the first side rods on two sides are connected with a side transverse rod, and the side connecting rods on two sides and the side transverse rod form an armrest assembly.

10. The stroller according to claim 8, wherein the side support on each side further comprises a seat rod assembly, the seat rod assembly comprises a front seat rod and a rear seat rod, a front portion of the front seat rod is pivotally connected via an eleventh shaft with an upper portion of the sliding rod or with a lower portion of the side connecting rod, a rear portion of the front seat rod is pivotally connected with a front portion of the rear seat rod via a twelfth shaft, and a rear portion of the rear seat rod is pivotally connected to the rear connecting rod via a thirteen shaft, wherein, axes of the eleventh shaft and the tenth shaft are parallel with each other or extend collinearly, and a position at which the thirteen shaft is on the rear connecting rod is located below a center line around which the rear connecting rod and the upper connecting rod are rotating with respect to each other.

11. The stroller according to claim 1, wherein a lower portion of the front support on each side is provided with a set of the front wheel assembly, a lower portion of the rear support on each side is provided with a set of the rear wheel assembly, and when the front support and the rear support fold up along a front-rear direction, two sets of the front wheel assemblies fold up between two sets of the rear wheel assemblies along a left-right direction.

12. The stroller according to claim 1, wherein the push rod comprises a lower push rod and an upper push rod slidably connected to the lower push rod capable of sliding along a length extension direction of the lower push rod, a lower portion of the lower push rod is pivotally connected with the upper portion of the upper support rod, and the upper portion of the upper connecting rod is pivotally connected to the lower push rod.

13. The stroller according to claim 1, wherein the transverse brace assembly comprises a front transverse rod fixedly disposed between the lower portions of the front supports on the two sides, an upper transverse rod fixedly disposed between upper portions of the push rods on the two sides, wherein, the front supports on the two sides and the front transverse rod form a U-shaped rod with an upward opening, and the push rods on the two sides and the upper transverse rod form a U-shaped rod with a downward opening.

14. The stroller according to claim 1, wherein after the front support, the rear support, the upper support rod, the push rod, the upper connecting rod, the rear connecting rod and the lower connecting rod of the side support on each side fold up with respect to each other to achieve a primary folding of the stroller frame, the side supports on the two sides fold up in opposite directions with respect to the transverse brace assembly in a left-right direction to achieve a secondary folding of the stroller frame.

15. The stroller according to claim 14, wherein the transverse brace assembly comprises a first transverse brace disposed between the front supports on the two sides, a second transverse brace disposed between the rear supports on the two sides, and a third transverse brace disposed between the push rods on the two sides, the first transverse brace is pivotally connected with the front supports on the two sides respectively via 1-1 shafts, the second transverse brace is pivotally connected with the rear supports on the two sides respectively via 2-1 shafts, the third transverse brace is pivotally connected with the push rods on the two sides respectively via 3-1 shafts, and when the primary folding of the stroller frame has been completed, axes of the 1-1 shaft, the 2-1 shaft and the 3-1 shaft on one same side are parallel with each other or extend collinearly.

16. The stroller according to claim 1, wherein the transverse brace assembly is disposed between the side supports on the two sides capable of folding up in a left-right direction, and the transverse brace assembly comprises a bottom transverse brace rod assembly capable of unfolding and folding up in the left-right direction and/or a rear transverse brace rod assembly capable of unfolding and folding up in the left-right direction, wherein the bottom transverse brace rod assembly is disposed between the front supports on the two sides and the lower portions of the rear connecting rods on the two sides, or, the bottom transverse brace rod assembly is disposed between the front supports on the two sides and the sliding members on the two sides, and,
 the rear brace rod assembly is disposed between the rear supports on the two sides and the rear portions of the lower connecting rods on the two sides; or,
 the rear brace rod assembly is disposed between the rear supports on the two sides and the sliding members on the two sides.

17. The stroller according to claim 16, wherein the rear brace rod assembly is a cross-shaped brace assembly comprising two rear brace rods pivotally connected with each other at middle portions thereof, one end portion of each of the rear brace rod is rotatably connected to the upper portion of the rear support on one side and the other end portion thereof is rotatably connected to the rear portion of the lower connecting rod; or,
    one end portion of each of the rear brace rod is rotatably connected to the upper portion of the rear support on one side and the other end portion thereof is rotatably connected to the sliding member on the other side;
    the bottom transverse brace rod assembly comprises two sets of first rods and second rods respectively pivotally connected with each other end to end, middle portions of two of the first rods are pivotally connected with each other and middle portions of two of the second rods are pivotally connected with each other, the other ends of two of the first rods are respectively rotatably connected to the front support and the lower portion of the rear connecting rod of the side support on one side, and the other ends of two of the second rods are respectively rotatably connected to the lower portion of the rear connecting rod and the front support of the side support on the other side.

18. The stroller according to claim 16, wherein the transverse brace assembly further comprises an upper brace rod assembly disposed between the upper portions of the push rods on the two sides, the upper brace rod assembly comprises two upper brace rods pivotally connected end to end, and the other ends of the two upper brace rods are respectively pivotally connected with the upper portions of the push rods.

19. The stroller according to claim 1, wherein, the transverse brace assembly further comprises one or more lower transverse rods fixedly disposed between the lower connecting rods on the two sides.

* * * * *